Feb. 27, 1962 L. L. YAEGER ETAL 3,023,099
PHOTOGRAPHIC PROCESS FOR ETCHING SCRIBING MEDIA
Filed April 23, 1956
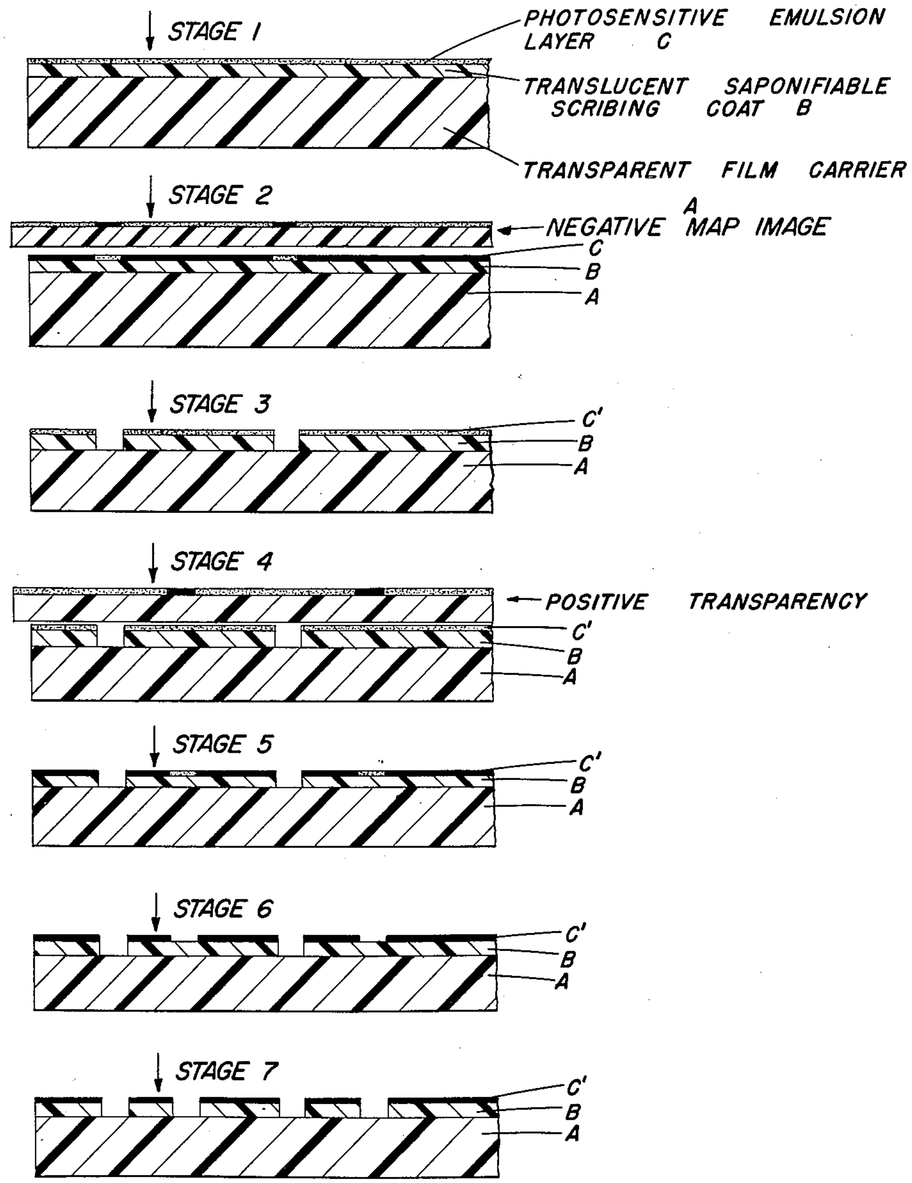
STAGE 1, STAGE 2, STAGE 3, STAGE 4, STAGE 5, STAGE 6, STAGE 7
INVENTORS
LUTHER L. YAEGER
RISTO P. LAPPALA
BY
Attorney United States Patent Office 3,023,099

Patented Feb. 27, 1962

3,023,099

PHOTOGRAPHIC PROCESS FOR ETCHING SCRIBING MEDIA

Luther L. Yaeger and Risto P. Lappala, Madison, Wis., assignors to Bjorksten Research Laboratories, Inc., Fitchburg, Wis., a corporation of Illinois Filed Apr. 23, 1956, Ser. No. 579,705

4 Claims. (Cl. 96—35)

This invention relates to a photographic etching process and more particularly to a process for photographically etching scribing media employed in preparing color separation negatives for lithographic reproduction of multicolored manuscripts.

In multicolor lithographic processes it is necessary to prepare a separate lithographic plate for each color that appears in the finished manuscript. The separate lithographic plates are prepared from what are termed color separation negatives which are generally translucent or opaque sheets of composite material prepared by a photographic, chemical etching, or manual engraving process to transmit light in those areas of the manuscript image in which it is desired to subsequently print or reproduce a single color. Each individual color separation lithographic plate is prepared by exposing the sensitized surface of a lithographic plate to strong actinic light image created by passing the light through a finished color separation negative. Thereby the content of the manuscript image to be printed in a single color is projected onto, and by subsequent processing, fixed on the surface of the lithographic plate. The present invention relates to a photographic process readily adapted for the preparation of color separation negatives and is especially well suited for use in the so called "plastic scribing" method of preparing color separation negatives.

The "plastic scribing" method of preparing color separation negatives is named from the practice of preparing the color separation negatives on a composite laminar sheet called a scribing media which frequently comprise a plastic base sheet material.

One object of the present invention is to provide a photographic method of etching complex designs and lettering on scribing media.

Another object of our invention is to provide a method of resensitizing a photographic emulsion after developing and fixing and in preparation for further exposure to light images.

Still another object of our invention is to provide a process for chemically removing an oleoresinous scribing coat from selected and exposed areas of a color separation scribing media.

These and other objects and advantages of our invention will be apparent from the following specification and claims and drawings wherein stages 1–7 depict process steps as labelled.

Our invention relates briefly to preparing and utilizing a transparent base, an intermediate translucent oleoresinous saponifiable layer and a coating of colloidal light insolubilizable media. Our process comprises the steps of resensitizing a light insolubilized, developed and fixed photosensitive emulsion on such a media by soaking in an aqueous bath containing water soluble bichromate, drying the media, then applying an opaque stencil (mask or photographic transparency opaque to actinic light in certain areas) to the dried sensitized surface of the light insolubilized emulsion, exposing to actinic light, removing the stencil and soaking the media in a warm water bath. The portions of the photographic emulsion under the opaque portions of the stencil, and therefore not exposed to the actinic light, are solubilized by the warm water, and removed. We then dry thoroughly and then solubilize the exposed portions of the scribing coat by immersing the media in an anhydrous alcohol solution of an alkali metal hydroxide and remove the solubilized scribing coat by applying water.

In the plastic scribing process for making color separation negatives of map manuscripts it is less time consuming to incorporate some symbolization and all lettering by some procedure other than scribing or positive stick-up. The typical scribing medium as presently used is a transparent plastic sheet with an oleoresinous coating which carries sufficient translucent pigment of a color to screen out all actinic light. A photosensitive coating is applied over this scribing coat to carry the negative map image which serves as a guide for the draftsman as he scribed out grid lines, roads, rivers, etc. which are to reproduce on the lithographic plate corresponding to the particular color separation negative with which he is working.

The method of applying symbolization and lettering has been to tediously scratch them out of the scribing medium or stick-up positive transparencies on a transparent sheet in the desired locations after which a negative photographic transparency must be made for printing onto the litho plate. Our invention eliminates these by utilizing the photosensitive coating and scribing coat phases as a medium for carrying negative lettering.

In essence, our process eliminates the addition of hardening agents to the gelatin of the photosensitive medium in the coating and development steps but incorporates it after the scribing operation when it is desirable to resensitize the gelatin in order to make an etch-resisting mask from it. The etching bath must be a material which has no effect on the hardened gelatin but will soften the exposed scribing coat so that it will readily flush off with water. Anhydrous alcoholic caustic solutions have been most effective as etches in this application.

The process is illustrated in the drawings by the following steps:

(1) A conventional silver halide photographic emulsion without chrome alum or other hardeners is coated over the scribing face of a commercial vinyl base sheet so that the dried gelatin layer is about 1 mil thick (stage 1).

(2) A negative map image is printed onto the photo emulsion, developed and fixed in conventional manner except that a plain hypo fixing bath is used (no boric acid or alum) (stage 2).

(3) After washing and drying, the sheet is ready for scribing operations by the draftsman. When all line scribing required by the negative is completed, the gelatin phase is resensitized by soaking in the following bath (stage 3):

| | Gm. |
|---|---|
| Ammonium bichromate | 2 |
| Water | 25 |
| After solution: Denatured ethanol to | 100 |

Upon drying, the draftsman sticks on positive transparencies of lettering and complex symbolization with transparent pressure-sensitive tape in the desired areas (stage 4).

(4) After exposure to a mercury or carbon arc lamp, the transparencies are removed and the sheet soaked for two minutes in water at 120–130° F. (stage 5). The gelatin which was protected from light is still water soluble and becomes swollen and soft. When exposed to light, the gelatin insolubilized by the photolysis products of the bichromate resists swelling. By parallel strokes in opposite directions with a cotton swab or camel's hair brush, the soft solubilized gelatin is removed while still immersed in the warm water (stage 6).

(5) After thorough drying, the exposed scribing coat is etched out by soaking the sheet for 3 to 4 minutes in a 10% solution of sodium or potassium hydroxide in anhydrous alcohol. The oleo-resinous binder is readily saponified to a water dispersible state and the silicaceous translucent filler in the scribing coat is also solubilized somewhat by the caustic. A fine spray of water over the face of the sheet flushes these reacted materials and leaves a negative image of the lettering and symbolization on the transparent plastic base (stage 7).

While gelatin has been mentioned as the resensitizable medium in the photographic emulsion, it is understood that any water soluble colloid capable of being insolubilized by bichromate such as gum arabic, casein, polyvinyl alcohol, etc. may be utilized. Gelatin is the preferred protective colloid for silver halide emulsions but other media may be used with other photographic systems such as diazo, blue-line, Van Dyke, brown-line, etc.

The insolubilization of certain colloidal substances when exposed to light in the presence of bichromates has been known for almost a century and is the basic reaction for the photomechanical reproduction art of today. For almost an equal period of time, these colloidal substances have also been used as binders and protective suspending media for photosensitive salts which make possible the photographic art. Our invention utilizes the same colloidal phase for both operations; the latter photographic method to produce an image for the guidance of an artist or draftsman in laying out his work who can then resensitize this medium to incorporate the first method into his program and obtain the benefit of its advantages in saving time and labor.

*Example*

A polyvinyl pyridine based scribing composition as described in copending application, Serial No. 571,578, filed March 14, 1956, now abandoned, was sprayed to a 0.0015 inch coating thickness of a glass-fiber cloth reinforced polyester type photo-template sheet and dried. A silver chloride-tartrate print-out emulsion in gelatin containing no alum or other hardener was roller coated over this scribing medium to give a 0.001 inch dry film thickness. A paper columnar accounting sheet with red, blue, black lines and black numerals and lettering was transparentized and dried. Three contact prints were made on separate sensitized scribe sheets by contacting the photosensitive face to the transparent sheet and exposing for 11 minutes at 14″ distance from a 500 watt pressurized mercury arc in a quartz tube lamp. Before the sheets were separated from the master copy, holes were punched in the four edge margins in alignment with reference marks on the master to assure proper registration. The lines in the image on each sheet were then scribed out to the transparent base to produce three different color separation negatives. The black line negative had its gelatin resensitized by immersion in a bichromate solution and drying. A positive transparency of the numerals and lettering was taped to the resensitized surface after being superimposed over their image in the gelatin emulsion. After 7 minutes exposure at 18″ distance from a 3 kw. open carbon arc, the exposed gelatin was insolubilized to 130° F. water which washed out the unexposed image of the numerals and letters. Treatment with a 5% hydrochloric acid bath solubilized the exposed polyvinyl pyridine scribe medium leaving a transparent negative image of the numerals and letters. Three lithographic plates were made from the negatives with alignment of the registration marks and when printed on paper via inks of the three colors, exact duplicates of the original columnar accounting sheet could be made.

*Example*

A styrene-maleic anhydride copolymer scribing composition as described in copending application, Serial No. 571,578, filed March 14, 1956, was knife-coated to 0.8 mil dry thickness on a 7 mil oriented, transparent polyethylene terephthalate polyester base and dried by baking in a 225° F. ventilated oven. A photosensitive diazo salt in a polyvinyl alcohol binder solution was sprayed over this surface to form a ½ mil layer. A preliminary sketch for a three color poster in black ink on translucent linen tracing cloth was contact printed onto the diazo layer of 3 scribe sheets by a 13 minute exposure at 18″ distance from the mercury arm lamp previously described. The diazo images were developed by immersion in an alkaline coupling agent bath, rinsing in water and drying. All simple straight and curved line work was done by scribing to the base plastic on each sheet depending upon which color was to be reproduced. Corrections or alterations could be made as the work progressed by brushing in the desired areas with the scribing paint composition, blowing a warm airblast from a hair dryer over it and then top-coating with polyvinyl alcohol solution.

The sheets which were to have lettering or large masses of color had the polyvinyl alcohol resensitized by a bichromate treatment. Under subdued lighting from a low wattage tungsten lamp, black letter images on cellophane (commercially known as Artype and supplied by Artype, Inc., Chicago 6, Illinois) were burnished onto the surface in their proper positions. The large masses of color to be reproduced were then opaqued with a carbon black and starch paste applied with a brush. The exposed areas were then insolubilized by a similar exposure as mentioned above for the diazo printing. The Artype was peeled off and the sheets soaked in 145° F. water for 10 minutes. The starch opaquing paste and also the unexposed polyvinyl alcohol then readily washed off with a warm water spray. A 5 minute soak in 10% potassium carbonate solution softened the exposed scribe coat sufficiently so that a similar spray left the desired three color separated negatives.

The invention is not limited in scope to the combinations of materials described in the examples. The scribing medium can be any compositions as disclosed in copending application, Serial No. 571,578, filed March 14, 1956, or compositions commercially available with an oleoresinous base.

The insolubilizable phase can be any naturally occurring colloidal material such as gelatin, engraver's glue, egg albumen, gum arabic, casein or gluten capable of being cross-linked, tanned, or hardened by the presence of the photolysis products of bichromate salts. Synthetically derived materials such as polyvinyl alcohol, polyvinyl pyrrolidone, partially hydrolyzed polyvinyl acetate or partially hydrolyzed polyvinyl acetals may be used as binder materials. The photographic system for initial image recording can be of the silver halide type, silver-organic salts, diazonium compound, iron Prusside blue-line, Van Dyke or Kallitype sensitization.

Exposure times for the initial image formation will vary from a few seconds at 6′ distance from a 60 watt tungsten lamp for silver halide emulsions to 30 minutes at 2′ distance from a 3 kw. carbon arc lamp for the slower iron salt formulations. Development procedures for this initial image will also depend upon the photographic system used; silver halide-gelatin emulsions will have the latent image converted to metallic silver by aqueous solutions of organic reducing agents; the diazo systems will be coupled with phenolic reagents in an aqueous, alkaline bath; and the iron salt or silver-organic salt systems will have the image formed during exposure so will only need a water wash to remove unexposed metallic salts.

The time required for the resensitization of the colloidal binder phase by the bichromate bath will depend upon the type of binder, its thickness, and the bath concentration and composition. A few seconds immersion will suffice for very thin sections in a rapidly absorbed solution; there is no critical maximum limitation on immersion time after complete penetration of the film has occurred, but for practical purposes this would not be prolonged excessively to slow down production.

| | Percent |
|---|---|
| Bichromate salt concentration | 01. to 10 |
| Water concentration | 10 to 100 |
| Alcohol concentration | 0 to 89.9 |

The alcohol can be any of the lower aliphatic water miscible series such as methanol, ethanol, isopropanol and is included to hasten the drying of the resensitized sheet and also to assist penetration into films which tend to be slightly hydrophobic.

Exposure time for the resensitized sheet will be dependent upon the type of sensitized colloid, its thickness, transparency of the superimposed sheet and light intensity and will range from 3 to 20 minutes at one to three foot distances from a high intensity source rich in the wavelengths below 3500 A.

We claim:

1. A process for photochemically etching scribing media having a transparent base, a translucent saponifiable scribing coat solubilizable by a saponifying solution and a photosensitive emulsion layer of water soluble colloid free of hardening agents comprising the steps of photographically exposing said emulsion layer to provide a photographic image of an object thereon, photographically developing and fixing said emulsion layer without insolubilizing said colloid, scribing said emulsion layer and said scribing coat to remove a portion thereof defined by at least a portion of said photographic image thereon, resensitizing the remainder of said emulsion layer with a sensitizer which will harden said colloid on exposure to light, photographically exposing the resensitized portion of said emulsion layer to actinic light to provide a photographic image of a second object, soaking said scribing media in aqueous solution to solubilize and remove all unexposed portions of the resensitized emulsion, soaking said scribing media in a second solution to operably solubilize and remove all of said scribing coat uncovered by removal of said emulsion thereby to yield a composite image in relief on said scribing media.

2. A process as in claim 1 wherein said emulsion layer resensitizing is accomplished by treating said sheet with a solution containing a bichromate compound.

3. A process as in claim 1 wherein said scribing layer is of actinic light opaque, hydrophobic, saponifiable, polyelectrolyte composition.

4. A process as in claim 1 wherein said scribing layer is of actinic light opaque saponifiable oleoresinous composition.

References Cited in the file of this patent

UNITED STATES PATENTS

| | | |
|---|---|---|
| 842,297 | Bonfils et al. | Jan. 29, 1907 |
| 1,285,015 | Browning | Nov. 19, 1918 |
| 1,655,127 | Beebe | Jan. 3, 1928 |
| 1,981,102 | Hagedorn et al. | Nov. 20, 1934 |
| 2,043,905 | Seymour | June 9, 1936 |
| 2,159,683 | Beauvais | May 23, 1939 |
| 2,257,143 | Wood | Sept. 30, 1941 |
| 2,301,770 | Bassist | Nov. 10, 1942 |
| 2,383,568 | Rudnick | Aug. 28, 1945 |
| 2,446,915 | Filmer | Aug. 10, 1948 |

FOREIGN PATENTS

| | | |
|---|---|---|
| 571,107 | Great Britain | Aug. 7, 1945 |

UNITED STATES PATENT OFFICE

CERTIFICATE OF CORRECTION

Patent No. 3,023,099 February 27, 1962

Luther L. Yaeger et al.

It is hereby certified that error appears in the above numbered patent requiring correction and that the said Letters Patent should read as corrected below.

Column 5, line 4, for "01. to 10" read -- 0.1 to 10 --.

Signed and sealed this 26th day of June 1962.

(SEAL)
Attest:

ERNEST W. SWIDER
Attesting Officer

DAVID L. LADD
Commissioner of Patents